(12) United States Patent
Zhou et al.

(10) Patent No.: US 12,719,329 B2
(45) Date of Patent: Aug. 25, 2026

(54) COMPACT OUTER-ROTOR BRUSHLESS MOTOR FOR A POWER TOOL

(71) Applicant: Black & Decker Inc., New Britain, CT (US)

(72) Inventors: Yuming Zhou, Yangzhou City (CN); Tong Zheng, Suzhou City (CN); Hunk Liu, Suzhou (CN); Paik Gu, Suzhou (CN); Timothy W. French, Hampstead, MD (US)

(73) Assignee: BLACK & DECKER INC., New Britain, CT (US)

( * ) Notice: Subject to any disclaimer, the term of this patent is extended or adjusted under 35 U.S.C. 154(b) by 196 days.

(21) Appl. No.: 18/537,292

(22) Filed: Dec. 12, 2023

(65) Prior Publication Data

US 2024/0223042 A1 Jul. 4, 2024

Related U.S. Application Data

(60) Provisional application No. 63/477,872, filed on Dec. 30, 2022.

(51) Int. Cl.
*H02K 5/15* (2006.01)
*H02K 3/52* (2006.01)
(Continued)

(52) U.S. Cl.
CPC ............... *H02K 5/15* (2013.01); *H02K 3/522* (2013.01); *H02K 7/145* (2013.01); *H02K 11/215* (2016.01);
(Continued)

(58) Field of Classification Search
CPC ........ H02K 1/185; H02K 21/22; H02K 11/33; H02K 5/16; H02K 5/225; H02K 5/161; H02K 11/215; H02K 7/145
See application file for complete search history.

(56) References Cited

U.S. PATENT DOCUMENTS 3,794,869 A 2/1974 Apostoleris
4,818,911 A 4/1989 Taguchi et al.
(Continued)

FOREIGN PATENT DOCUMENTS

CN 101860113 B 12/2011
CN 202798253 U 3/2013
(Continued)

OTHER PUBLICATIONS

Extended European Search Report dated Aug. 27, 2024 in related EP application No. 23217111.6, 12 pages.
(Continued)

*Primary Examiner* — Leda T Pham
(74) *Attorney, Agent, or Firm* — Amir R. Rohani

(57) ABSTRACT

A motor is provided including a motor housing, an end cap secured to an open end of the motor housing, a stator, a rotor shaft, a rotor mounted on the rotor shaft; and a positional sensor circuit board including position sensors in magnetic interface with the rotor. The end cap includes a radial body having a center pocket arranged to securely support a bearing of the rotor shaft, and a molded structure formed through at least a portion of the radial body. The molded structure includes: a first portion formed to axially constrain the bearing within the center pocket on one side of the radial body, and a second portion forming a support structure projecting from another side of the radial body to structurally support the positional sensor circuit board relative to the rotor.

17 Claims, 13 Drawing Sheets

(51) Int. Cl.
*H02K 7/14* (2006.01)
*H02K 11/215* (2016.01)
*H02K 21/22* (2006.01)
*B25B 21/00* (2006.01)

(52) U.S. Cl.
CPC ............ *H02K 21/22* (2013.01); *B25B 21/004* (2013.01); *H02K 2211/03* (2013.01)

(56) References Cited

U.S. PATENT DOCUMENTS 4,882,510 A 11/1989 Newberg
5,798,589 A 8/1998 Ohi et al.
6,150,743 A * 11/2000 Van Dine ................ H02K 5/00 310/90
6,376,952 B1 4/2002 Stenta
6,737,782 B2 5/2004 Suzuki et al.
6,856,065 B2 2/2005 Suzuki et al.
6,971,152 B2 12/2005 Uchida et al.
6,992,419 B2 1/2006 Kim et al.
7,015,603 B2 3/2006 Barrho et al.
7,095,193 B2 8/2006 Kellogg et al.
7,356,906 B2 4/2008 Kim et al.
7,443,074 B2 10/2008 Kim et al.
7,652,406 B2 1/2010 Kim et al.
7,956,505 B2 6/2011 Shin et al.
8,354,764 B2 1/2013 Hara
8,525,458 B2 9/2013 Hatano et al.
8,922,082 B2 12/2014 Kwon
8,933,601 B2 1/2015 Asai et al.
9,048,716 B2 6/2015 Migita et al.
9,385,572 B2 7/2016 Lu et al.
9,577,497 B2 2/2017 Taniguchi
9,735,658 B2 8/2017 Woo
9,755,490 B2 9/2017 Inuzuka
9,800,116 B2 10/2017 Iwai et al.
9,800,121 B2 10/2017 Kim et al.
9,843,242 B2 12/2017 Kim et al.
9,843,243 B2 12/2017 Kim et al.
9,847,690 B2 12/2017 Park et al.
9,941,765 B2 4/2018 Park et al.
10,069,362 B2 9/2018 Kawasaki et al.
10,069,383 B2 9/2018 Busse-Grawitz et al.
10,069,384 B2 9/2018 Kim et al.
10,291,103 B2 5/2019 Holman
10,312,774 B2 6/2019 Dumas
10,389,192 B2 8/2019 Tang et al.
10,432,068 B2 10/2019 Kim
10,451,072 B2 10/2019 Aso et al.
10,491,060 B2 11/2019 Wang et al.
10,494,014 B2 12/2019 Yamashita et al.
10,594,173 B2 3/2020 Andrieux et al.
10,673,291 B2 6/2020 Oikawa et al.
10,778,060 B2 9/2020 Kodama et al.
10,855,134 B2 12/2020 Ishii et al.
10,903,723 B2 1/2021 Chen
10,938,262 B2 3/2021 Hattori et al.
11,070,112 B2 7/2021 Shimokawa et al.
11,081,929 B2 * 8/2021 Sonoda ................ H02K 5/1732
11,251,684 B2 2/2022 Kim et al.
11,342,812 B2 5/2022 Nakamura et al.
11,342,814 B2 5/2022 Shimokawa et al.
11,362,556 B2 6/2022 Han
11,411,472 B2 8/2022 Chen
2006/0261692 A1 11/2006 Wong et al.
2014/0117799 A1 * 5/2014 Lu .......................... H02K 21/22 310/90
2019/0140532 A1 5/2019 Wang et al.
2020/0195105 A1 6/2020 Ueno et al.
2020/0208859 A1 7/2020 Oya et al.
2020/0274409 A1 8/2020 Kawata et al.
2020/0343780 A1 10/2020 Fogle et al.
2020/0343789 A1 10/2020 Fogle et al.
2021/0126510 A1 4/2021 Liu et al.
2021/0194321 A1 * 6/2021 Jefferies ............... H02K 5/1735
2021/0336497 A1 10/2021 Lee et al.
2022/0014061 A1 1/2022 Matsunaga et al.
2022/0069650 A1 3/2022 Shiraki et al.
2022/0140672 A1 5/2022 Shimokawa et al.
2022/0224199 A1 7/2022 Shirazee
2022/0247251 A1 8/2022 Jefferies et al.
2022/0247257 A1 8/2022 Jefferies et al.
2022/0247258 A1 8/2022 Jefferies et al.
2022/0247259 A1 8/2022 Jefferies et al.
2022/0247270 A1 8/2022 Jefferies et al.

FOREIGN PATENT DOCUMENTS

CN 203537205 U 4/2014
CN 104300762 A 1/2015
CN 104578663 A 4/2015
CN 208923969 U 5/2019
CN 212627377 U 2/2021
CN 215498529 U 1/2022
CN 216490006 U 5/2022
CN 216672732 U 6/2022
DE 102006017905 A1 10/2007
DE 102017207526 A1 11/2017
DE 102020203274 A1 9/2021
EP 1936778 B1 7/2011
EP 3840180 A1 6/2021
GB 667479 A 3/1952
JP 6262058 B2 1/2018
JP 6780857 B2 11/2020
KR 100832629 B1 5/2008
WO 2020195391 A1 10/2020

OTHER PUBLICATIONS

Partial European Search Report dated Jun. 3, 2024 in related EP application No. 23217111.6, 15 pages.

* cited by examiner 140
144
141
143
142
145
147

150

COMPACT OUTER-ROTOR BRUSHLESS MOTOR FOR A POWER TOOL

RELATED APPLICATION

This patent application claims the benefit of U.S. Provisional Patent Application No. 63/477,872 filed Dec. 30, 2022, which is incorporated herein by reference in its entirety.

FIELD

This disclosure relates to a brushless motor assembly for a rotary tool, and particularly to an outer-rotor motor assembly having a modular design.

BACKGROUND

A brushless direct-current (BLDC) motor typically includes a stator that is electronically commuted through various phases and a permanent magnet rotor that is rotatably driven relative to the stator as the phases of the stator are sequentially energized. The stator is commonly provided as a cylindrical core with a hollow center that receives the rotor therein. The rotor is mounted on a rotor shaft.

In some power tool applications, an outer-rotor BLDC motor is provided. Outer-rotor BLDC motors are typically capable of building more inertia in the rotor shaft due to the greater mass of the rotor and are more suitable for certain power tool applications. US Publication No. 2019/0058373, which is incorporated herein by reference, provides an example of a nailer that is provided with an outer-rotor BLDC motor, where a flywheel is integrally mounted on the outer surface of the rotor.

What is needed is a compact outer rotor motor having a high power density suitable for portable power tool applications.

SUMMARY

According to an embodiment, a brushless direct-current (BLDC) motor is provided including a motor housing having an open end, an end cap secured to the open end of the motor housing, a stator housed within the motor housing, a rotor shaft extending through the motor housing, a rotor rotatably driven relative to the stator and mounted on the rotor shaft; and a positional sensor circuit board including a plurality of position sensors in magnetic interface with the rotor. The end cap includes a radial body having a center pocket therein arranged to securely support a bearing of the rotor shaft, and a molded structure formed through at least a portion of the radial body. The molded structure comprises: a first portion formed to axially constrain the bearing within the center pocket on a first side of the radial body, and a second portion forming a support structure projecting from a second side of the radial body to structurally support the positional sensor circuit board relative to the rotor.

In an embodiment, the rotor is an outer-rotor construction and the end cap further includes a stator mount having a substantially cylindrical body extending into an inner core of the stator to support the stator within the rotor.

In an embodiment, the positional sensor circuit board includes a disc-shaped construction having an outer diameter that is approximately equal to or greater than an outer diameter of the rotor, and an inner diameter that is approximately equal to or greater than an outer diameter of the stator. The positional sensor circuit board is located around the stator mount.

In an embodiment, the support structure comprises a plurality of posts projecting from the radial body around the stator mount.

In an embodiment, the support structure further comprises a plurality of legs that extend through the radial along the enter pocket, and the plurality of posts is coupled to the plurality of legs.

In an embodiment, the motor further includes a stator collar mounted to an end of the stator and supporting a plurality of stator terminals. The stator comprises a plurality of windings electrically coupled to the plurality of stator terminals and the plurality of stator terminals is coupled to a plurality of power wires to supply electric power to the plurality of windings. The stator collar is at least partially located between the stator mount and the positional sensor circuit board.

In an embodiment, each of the plurality of stator terminals includes a main body having at least a curved portion, a terminal tab extending from a first part of the main body for coupling to one of the plurality of power wires, and a wire receiving portion extending from a second part of the main body for coupling to at least one of the plurality of windings. The stator collar comprise a mold ring formed to support the plurality of stator terminals at set angular positions and at least partially capture both surfaces of the main body of the plurality of stator terminals.

In an embodiment, first portion of the molded structure comprises a ring-shaped portion formed within the center pocket in engagement with a rear end of an outer race of the bearing.

In an embodiment, the motor housing includes a main body having a solid metal cylindrical construction and a plurality of crimping projections projecting folded over the first side of the radial body of the end cap to securely retain the end cap to the motor housing.

According to an embodiment, a brushless direct-current (BLDC) motor is provided comprising: a motor housing having an open end; a stator housed within the motor housing; a rotor shaft extending through the motor housing; a rotor rotatably driven relative to the stator and mounted on the rotor shaft, wherein the rotor is an outer-rotor construction; and an end cap secured to the open end of the motor housing. The end cap includes a radial body having a center pocket therein arranged to securely support a bearing of the rotor shaft and a stator mount having a substantially cylindrical body extending into an inner core of the stator to support the stator within the rotor. The motor housing includes a main body having a solid metal cylindrical construction and a plurality of crimping projections projecting folded over a rear surface of the radial body of the end cap to securely retain the end cap to the motor housing.

In an embodiment, the end cap includes a plurality of threaded openings formed through the rear surface, and the plurality of crimping projections is secured to the end cap via a plurality of fasteners passing through a plurality of through-holes formed in the plurality of crimping projections and fastened into the plurality of threaded openings of the end cap.

In an embodiment, an outer circumference of the radial body includes a plurality of recessed portions that receive the plurality of crimping projections therethrough.

In an embodiment, the end cap further comprises a molded structure formed through at least a portion of the radial body. The molded structure comprises: a first portion formed to axially constrain the bearing within the center pocket, and a second portion forming a support structure projecting from a front surface of the radial body to structurally support a positional sensor circuit board relative to the rotor.

According to an embodiment, a brushless direct-current (BLDC) motor is provided comprising: a motor housing; a stator including a plurality of windings housed within the motor housing; a rotor shaft; a rotor rotatably driven relative to the stator and mounted on the rotor shaft, wherein the rotor is an outer-rotor construction; and a stator collar mounted to an end of the stator and supporting a plurality of stator terminals. The plurality of stator terminals is electrically coupled to the plurality of stator windings and to a plurality of power wires to supply electric power to the plurality of windings. Each of the plurality of stator terminals includes a main body having at least a curved portion, a terminal tab extending from a first part of the main body for coupling to one of the plurality of power wires, and a wire receiving portion extending from a second part of the main body for coupling to at least one of the plurality of windings. The stator collar comprises a mold ring formed to support the plurality of stator terminals at set angular positions and at least partially capture both surfaces of the main body of the plurality of stator terminals.

In an embodiment, the motor further includes an end cap mounted to an open end of the motor housing and including a stator mount having a substantially cylindrical body extending into an inner core of the stator to support the stator within the rotor, wherein the stator collar is mounted around the stator mount.

In an embodiment, each wire receiving portion is folded over the main body, and the mold ring includes a plurality of recessed regions through which the wire receiving portions are located.

In an embodiment, a power tool is provided including an elongated housing within which a BLDC motor as described in any of the above embodiments is disposed. The power tool further includes a battery receiving portion formed at one end of the elongated housing configured to receive a battery therein, and a tool head mounted to another end of the elongated housing and supporting an output shaft driveably coupled to the motor, wherein the elongated housing has a maximum diameter of smaller than or equal to approximately 32 mm.

BRIEF DESCRIPTION OF THE DRAWINGS

The drawings described herein are for illustration purposes only and are not intended to limit the scope of this disclosure in any way.

Throughout this specification and figures like reference numbers identify like elements.

DETAILED DESCRIPTION

It is to be understood that both the foregoing general description and the following detailed description are exemplary and explanatory only and are intended to provide an explanation of various embodiments of the present teachings.

Figure 1:
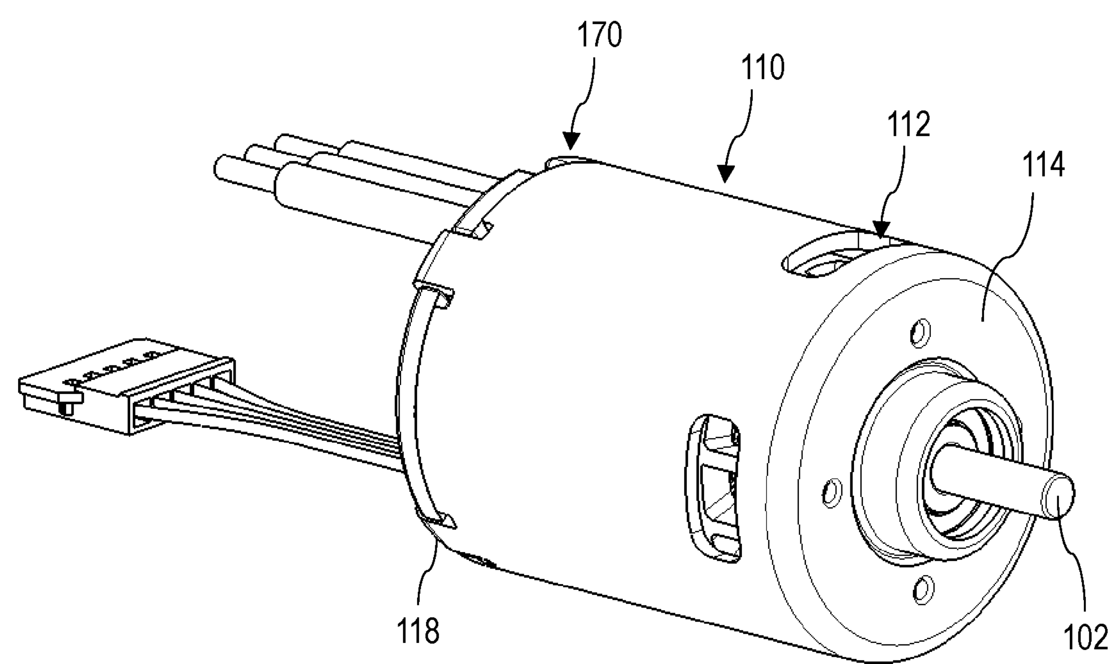
FIG. 1 depicts a perspective view of a compact outer-rotor brushless direct-current (BLDC) motor for a power tool, according to an embodiment.
Figure 2:
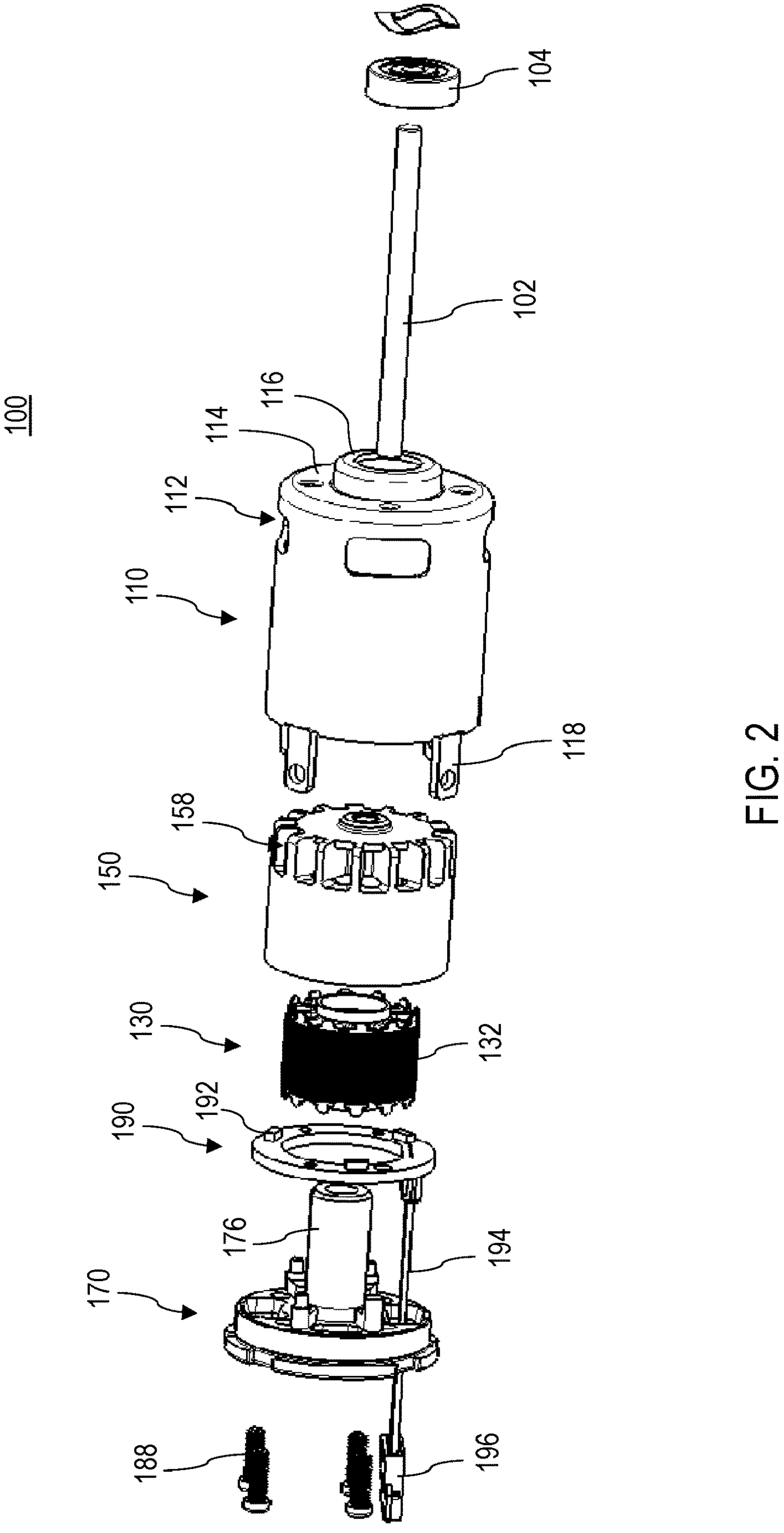
FIG. 2 depicts an exploded view of the motor including a motor housing, stator, an outer rotor, and an end cap, according to an embodiment.
Figure 3:
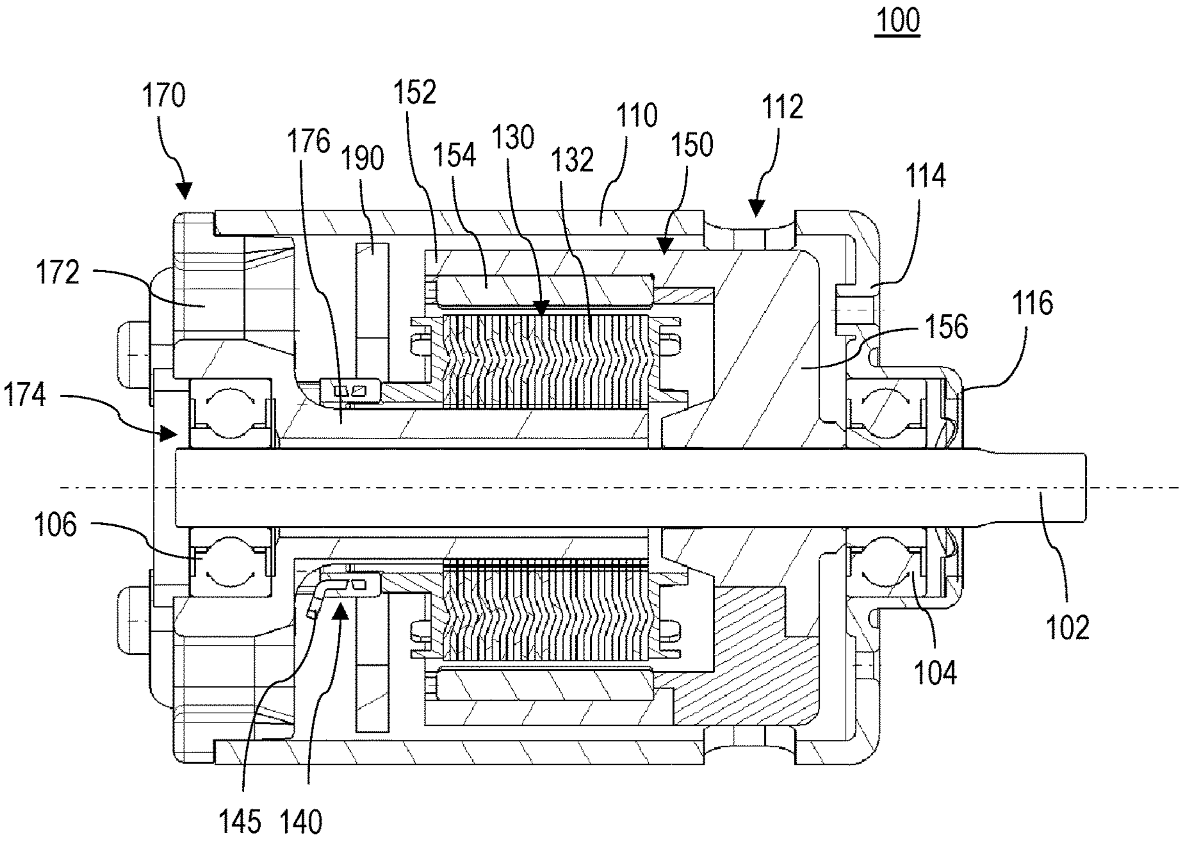
FIG. 3 depicts a side cross-sectional view of the motor, according to an embodiment.

FIG. 1 depicts a perspective view of an outer-rotor brushless direct-current (BLDC) motor 100 for a power tool, according to an embodiment. FIG. 2 depicts an exploded view of the motor 100, according to an embodiment. FIG. 3 depicts a side cross-sectional view of the motor 100, according to an embodiment.

Referring to these figures, in an embodiment, outer-rotor brushless (BLDC) motor 100 includes a motor housing 110 that forms an outer housing for supporting the motor components, a rotor shaft 102 that extends through the motor housing 110, a stator 130 that is electrically commutated by a controller (not shown) and electrically energized, an outer rotor 150 that is provided outside the body of the stator 130 and is mounted on the rotor shaft 102, an end cap 170 that is secured to the motor housing 110 and provides a support structure for the stator 130, and a positional sensor board 190, according to an embodiment. These features are described here in detail.

In an embodiment, motor housing 110 has a substantially cylindrical body that includes a series of peripheral air openings 112. The motor housing 110 includes an open end on one end of the cylindrical body and a closed end formed by a radial wall 114 on the other end. The radial wall 114 includes a center bearing pocket 116 that securely receives a front bearing 104 therein. The rotor shaft 102 is securely mounted inside the front bearing 104. In an embodiment, the motor housing 110 includes a series of crimping projections 118 extending axially rearwardly at the open end of the cylindrical body that crimp and secure the end cap 170 to the open end.

In an embodiment, stator 130 includes a stator core 132 formed by a series of laminations. The stator core 132 includes a central annular stator bore and a series of radially-outwardly projecting teeth on which stator windings (not shown) are wound. In an exemplary embodiment, the stator windings are wound in three phases, which, when respectively energized by a controller and switch circuit, cause rotation of the rotor 150.

In an embodiment, rotor 150 includes a cylindrical rotor core 152 formed around the stator assembly 130 and a series of magnets 154 surface-mounted on the inner surface of the rotor core 152 facing the stator assembly 130 with a small airgap therebetween. In an embodiment, a radial body 156 extends radially inwardly from the rotor core 152 and is rigidly mounted on the rotor shaft 102. In an embodiment, a series of air openings 158 are peripherally formed around the radial body 156 to generate an airflow through the stator 130 as the rotor 150 rotates.

In an embodiment, end cap 170 is mounted to the open end of the motor housing 110 and held in place via the crimping projections 118. In an embodiment, the end cap 170 includes a substantially radial body 172 forming a center pocket 174 that receives a rear bearing 106 therein. The rotor shaft 102 is radially and axially supported relative to the end cap 170, and thus relative to the motor housing 110, via the rear bearing 106 in cooperation with the front bearing 104. The bearing pocket 174 faces away from the stator 130 such that the rear bearing 106 is received into the bearing pocket 174 in the direction of the stator 130. In an embodiment, after the crimping projections 118 are folded inwardly on the inner surface of the radial body 172, a series of fasteners 188 secure the crimping projections 118 to the radial body 172. In an embodiment, end cap 170 further includes a stator mount 176 having a generally cylindrical body extending axial from the radial body 172. The stator mount 176 is sized to be received within the central annular stator bore of the stator core 132 to securely support the stator 130 relative to the end cap 170, and thus relative to the motor housing 110.

In an embodiment, positional sensor board 190 is mounted on the end cap 170 adjacent the rear end of the rotor 150, and includes a series of magnetic (e.g., Hall) sensors 192 arranged to magnetically interact with the rotor magnets 154. In an embodiment, the positional sensor board 190 is disc-shaped including an outer diameter that is approximately equal to or greater than an outer diameter of the rotor 150 and an inner diameter that is approximately equal to or greater than an outer diameter of the stator 130. In an embodiment, signal wires 194 connect the positional circuit board 190 to a connector 196, which is in turn connected to the controller to provide positional signals related to the rotor 150 to the controller.

Figures 4, 5:
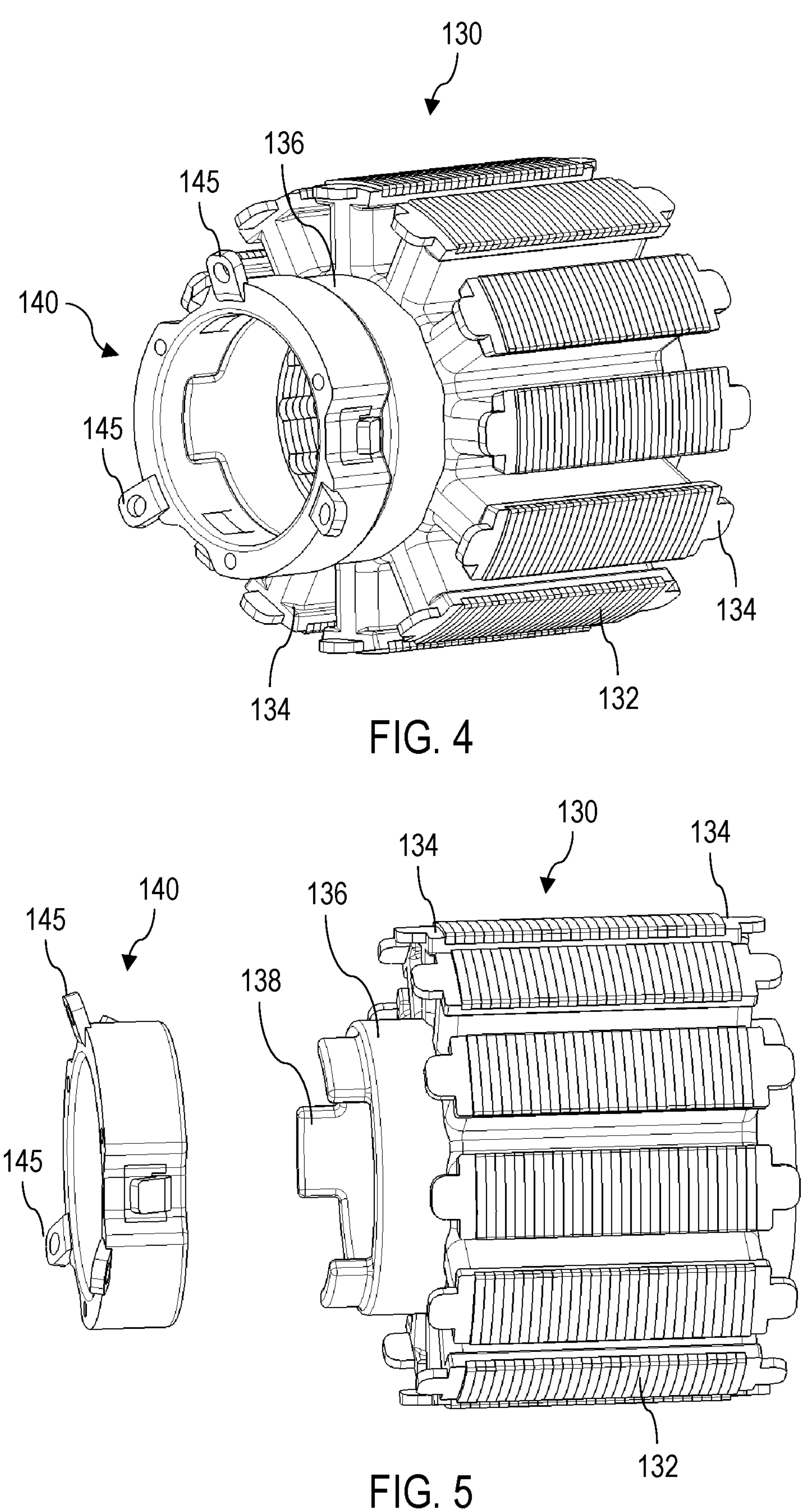
FIGS. 4 and 5 depict a perspective view and a partially-exploded perspective view of the stator including a molded stator collar, according to an embodiment.

FIGS. 4 and 5 depict a perspective view and a partially-exploded perspective view of the stator 130 including a molded stator collar 140, according to an embodiment.

In an embodiment, particular details of the stator 130 can be found, by way of example, in US Patent Publication No. 2020/0343789, and US Patent Publication no. 2021/0194341, both of which are incorporated herein by reference in their entireties. Briefly described, stator core 132 of the stator 130 is made of a series of steel laminations shaped to form the central annular bore and the radially-outwardly extending teeth. The stator windings (not shown) are wound around the stator teeth in a desired pattern, e.g., a delta or a wye, series or parallel, to form a plurality of phase of the stator. In an embodiment, the stator 130 includes three phases powered by three terminals. The phases of the motor, when energized appropriately in a desired sequence, cause rotation of the rotor 150 around the stator 130.

In an embodiment, one or more end insulators 134 are disposed on end surfaces of the stator core 132 to electrically insulate the stator windings from the stator core 132. In some examples, the end insulators 134 may penetrate within the slots forms between the teeth to provide further electrical insulation. In an embodiment, a rear one of the end insulators 134 includes an annular projection 136 projecting axially away from the stator 130. A distal end of the annular projection 136 includes a series of spaced-apart posts 138. In an embodiment, the molded stator collar 140 is mounted on the annular projection 136 and rotationally fixed thereto via the posts 138, as described below.

Figures 6, 7:
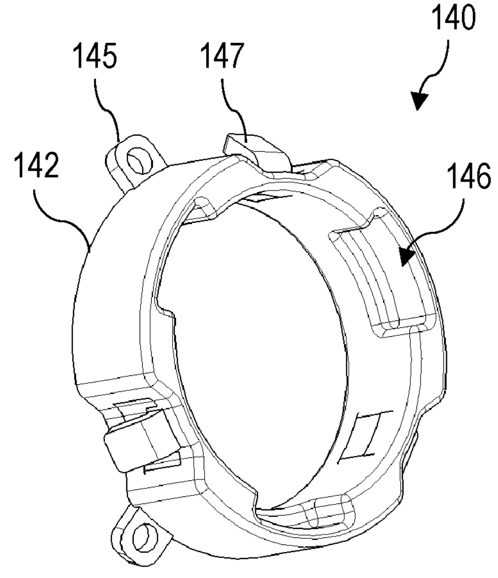
FIGS. 6 and 7 depict perspective and partially-exploded views of the molded stator collar, according to an embodiment.

FIGS. 6 and 7 depict perspective and partially-exploded views of the molded stator collar 140, according to an embodiment.

In an embodiment, molded stator collar 140 includes a series of terminals 141 and a mold ring 142 that structurally supports the terminals 141. In an embodiment, each terminal includes a main body 143 having a curved profile that is received within the body of the mold ring 142, a terminal tab 145 projecting along the axial direction away from the main body 143 and out of the mold ring 142, and a wire receiving portion 147 that extends axially away and is radially folded over the main body 143. The wire receiving portion 147 projects radially outside the mold ring 142.

In an embodiment, the mold ring 142 is formed to hold the three terminals 141 at predetermined angular positions (e.g., 120 degrees apart) while at least partially covering both surfaces of the main bodies 143 of the terminals 141 with plastic or resin material. In an embodiment, the mold ring 142 includes a series of recessed regions 144 in its outer surface through which the wire receiving portions 147 extend radially out. The magnet wires forming the stator windings are wrapped around the wire receiving portions 147 and fused to make an electrical connection with the terminals 141. In an embodiment, the mold ring 142 includes a series of recessed surfaces 146 in its inner surface arranged to receive the posts 138 of the end insulator 134.

Figure 8:
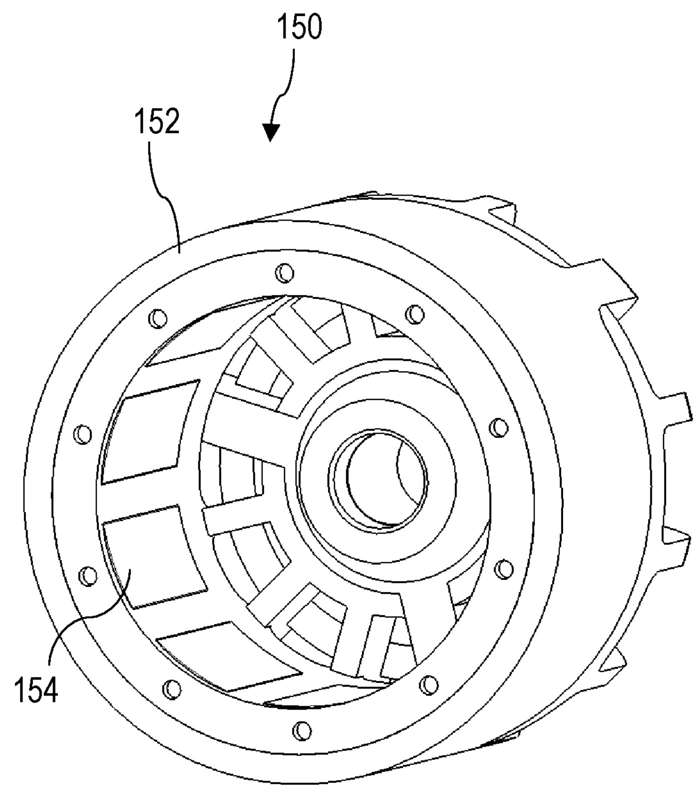
FIGS. 8 and 9 depict perspective views of the rotor, according to an embodiment.
Figure 9:
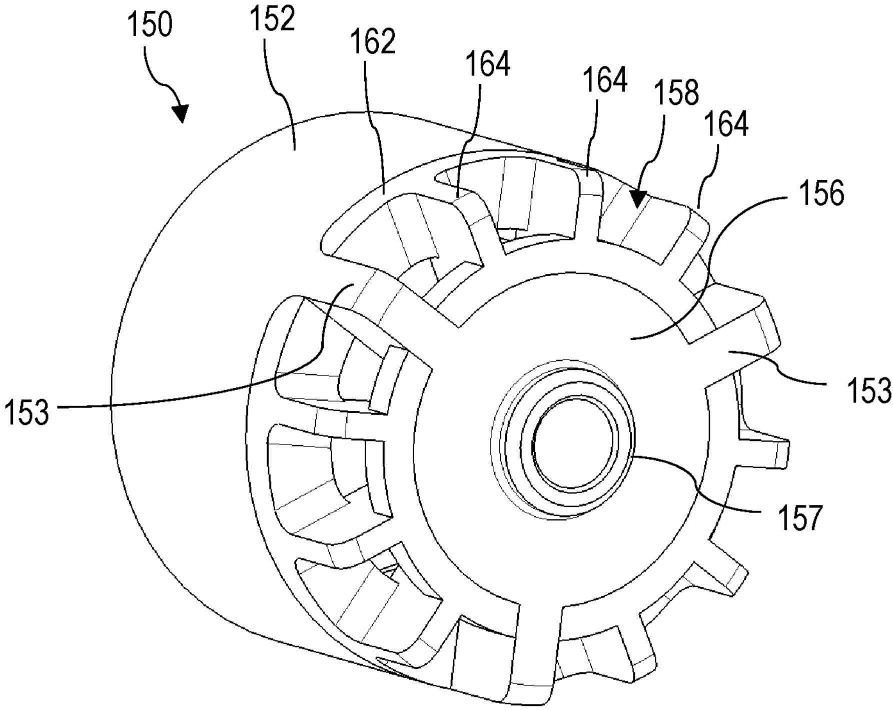
Figure 10:
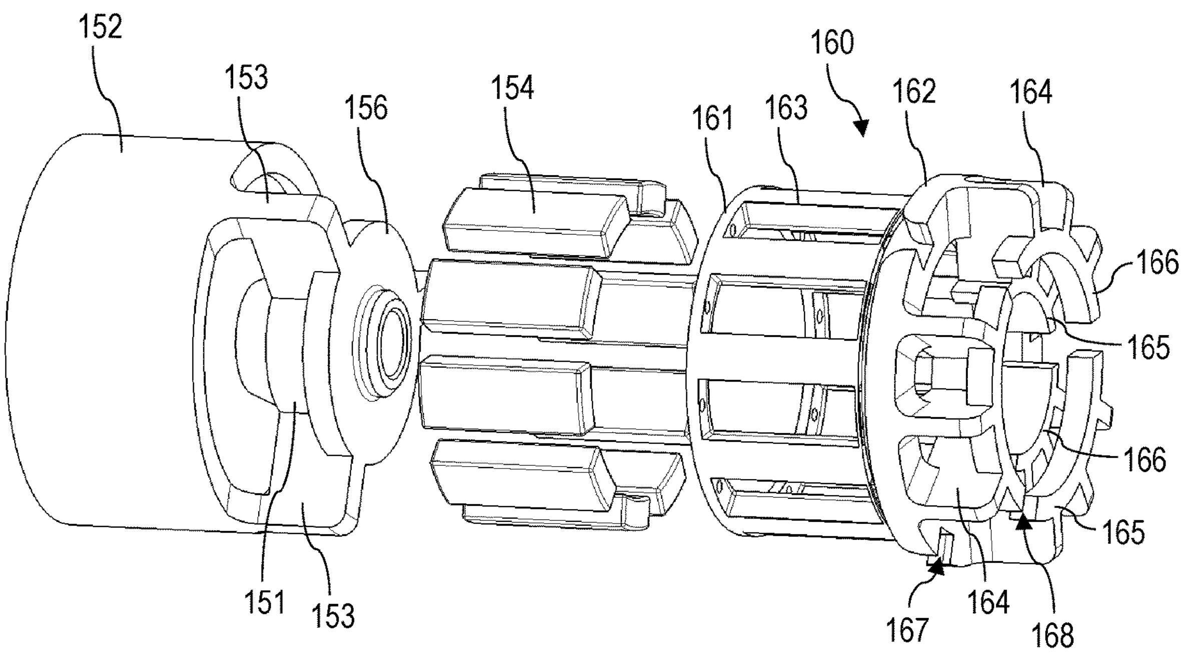
FIG. 10 depicts an exploded view of the rotor, according to an embodiment.

FIGS. 8 and 9 depict perspective views of the rotor 150, according to an embodiment. FIG. 10 depicts an exploded view of the rotor 150, according to an embodiment.

In an embodiment, as briefly discussed above, magnets 154 are mounted on the inner surface of the rotor core 152 facing the stator 130. To help secure the magnets 154 on the inner surface of the rotor core 152, in an embodiment, the rotor 150 includes a molded structure 160. In an embodiment, the molded structure 160 includes a first ring member 161 sized to be fittingly formed inside a rear end of the stator core 152, a second ring member 162 sized to be fittingly formed inside a front end of the stator core 152 and covering an axial end of the rear end of the stator core 152, and a series of axial members 163 extending between the two rings and forming pockets in between. The magnets 154 are securely retained within the pockets against the inner surface of the rotor core 152. In an embodiment, the axial members 163 and the magnets 154 may include corresponding slanted side walls designed to apply a radially-outward force to the magnets 154 against the inner surface of the rotor core 152.

In an embodiment, the radial body 156 extends radially inwardly from the rotor core 152 and is rigidly mounted on the rotor shaft 102. In an embodiment, the rotor 150 includes an annular body 151 that extends from the radial body 156 and defines a center through-hole 157 therein sized to be press-fitted onto the rotor shaft 102, e.g., via a bushing. In an embodiment, a series of metal blades 153 extend from the rotor core 152 to the annular body 151 to secure the rotor core 152. In an embodiment, the metal blades 153 generate an airflow with the rotation of the rotor 150 designed to cool the stator 130.

In an embodiment, to increase the number of blades for generating the airflow, the molded structure 160 additionally integrally forms a series of molded blades 164 projecting from the second ring member 162. In an embodiment, the molded blades 164 are aligned with and are of the same size and shape as metal blades 153. In an embodiment, molded blades 164 are provided at a higher number than the metal blades 153. In an example, two to four molded blades 164 are provided for each metal blade 153. Molded blades 164 extend radially partially from a third ring member 165 formed around the annular body 151 and partially from a fourth ring member 166 formed around the radial body 156. In an embodiment, the second, third, and fourth ring members include slots 167 and 168 through which the metal blades 153 are received. In an embodiment, metal blades 153 and molded blades 164 cooperate to form air openings 158 previously discuss, thus forming a fan for generating proper airflow through the motor. In an embodiment, the metal blades 153 and molded blades 164 are radially aligned with the peripheral air openings 112 so the warm air that has run through the motor is expelled radially out of the peripheral air openings 112.

Figure 11:
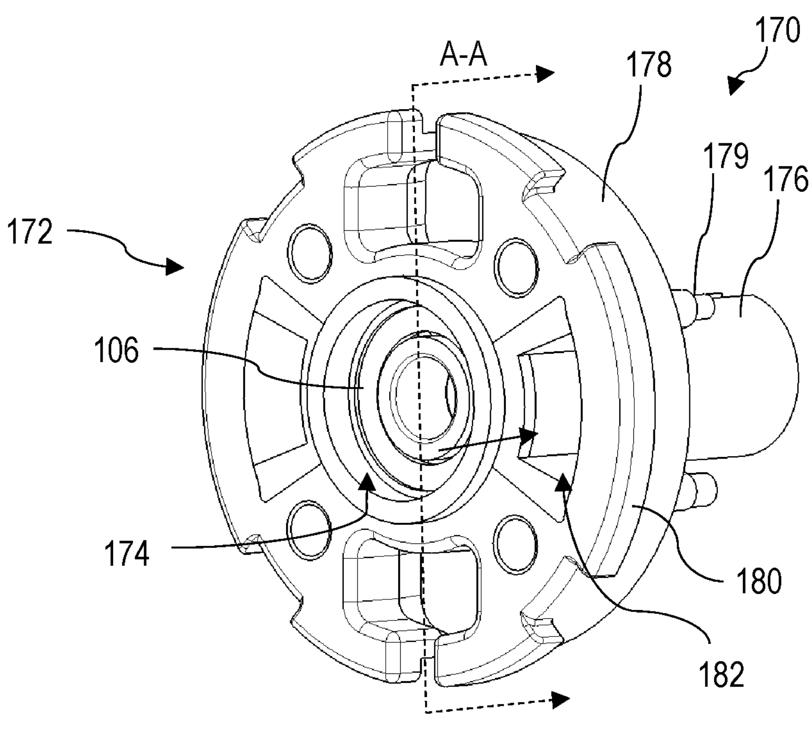
FIGS. 11 and 12 depict perspective views the end cap of the motor, according to an embodiment.
Figure 12:
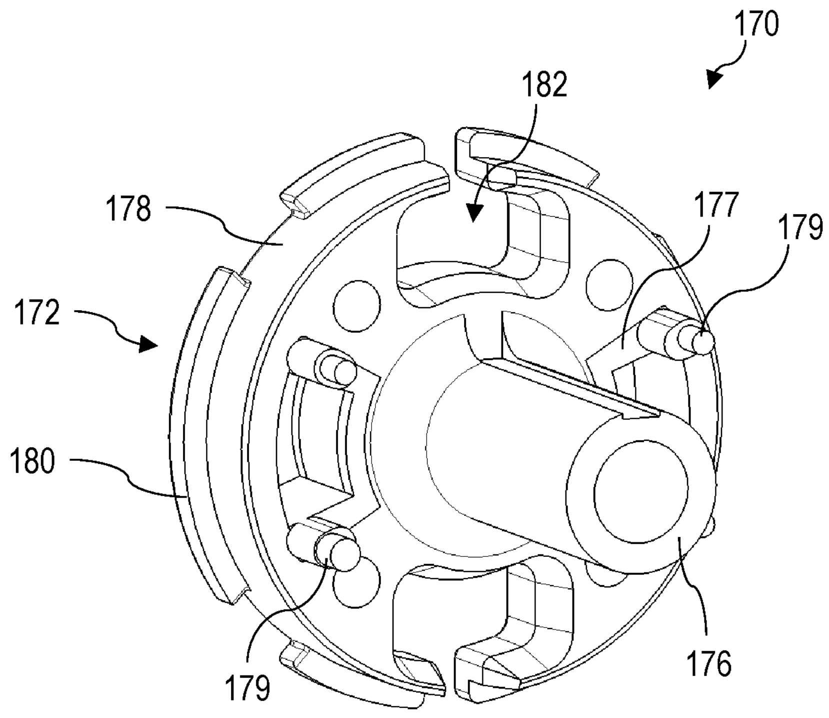
Figure 13:
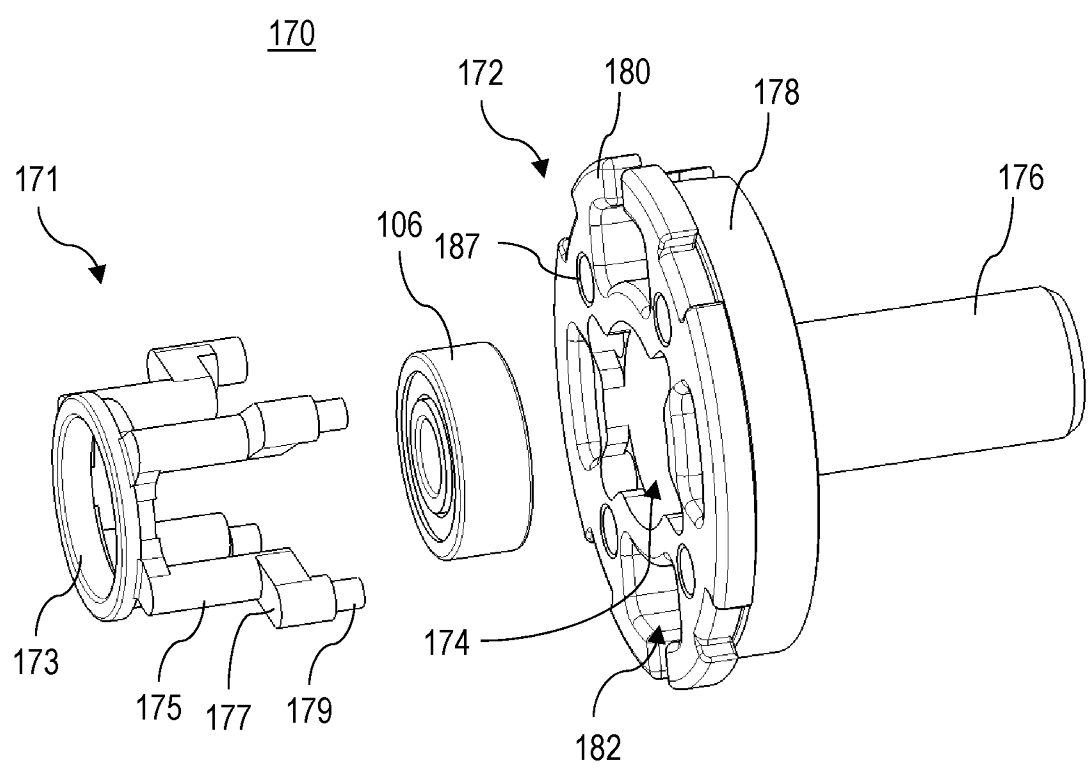
FIG. 13 depicts an exploded view of the end cap, according to an embodiment.
Figure 14:
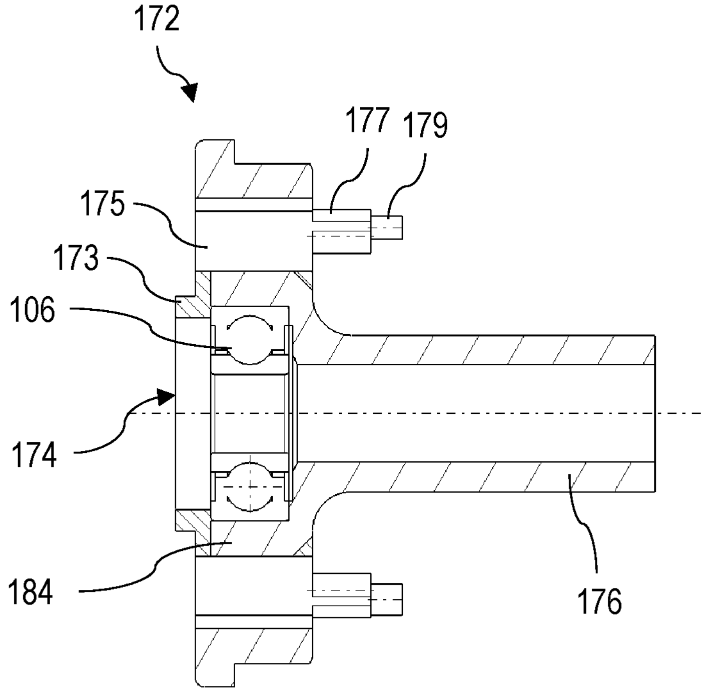
FIG. 14 depicts a side cross-sectional view of the end cap, according to an embodiment.

FIGS. 11 and 12 depict perspective views the end cap of the motor, according to an embodiment. FIG. 13 depicts an exploded view of the end cap, according to an embodiment. FIG. 14 depicts a side cross-sectional view of the end cap through a plane A-A of FIG. 11, according to an embodiment.

In an embodiment, as briefly described above, end cap 170 primarily includes the substantially radial body 172 that is mounted to the open end of the motor housing 110 and forms the center pocket 174 for supporting the rear bearing 106 of the rotor shaft 102 therein, and the stator mount 176 on which the stator 130 is mounted. In this manner, the end cap 170 provides radial and axial support for both the stator 130 and the rotor 150 relative to the motor housing 110.

In an embodiment, the radial body 172 of the end cap 170 includes an annular outer portion 178 sized to be firmly received through the open end of the motor housing 110 and a rim portion 180 that mates with the rear axial end of the motor housing 110. In an embodiment, the rim portion 180 includes a series of discrete portions having gaps 189 therebetween. In an embodiment, four gaps 189 are provided, which, as discussed later, are aligned with the crimping projections 118 of the motor housing 110. In an embodiment, the end cap 170 further includes a series of threaded openings 187 on its rear surface around the bearing pocket 174. In an embodiment, after the crimping projections 118 are folded inwardly on the inner surface of the radial body 172, the fasteners 188 are received through the crimping projections 118 and tightened into the threaded openings 187 to secure the crimping projections 118 to the radial body 172.

In an embodiment, the radial body 172 further includes a series of air inlets 182 around the center pocket 174 through which airflow generated by the fan flows in in the direction of the stator 130. The stator mount 176 extends axially from a front surface of the radial body 172. In an embodiment, the center pocket 174 is formed at a rear end of the stator mount 176. In an embodiment, as shown in FIG. 14, an annular wall 184 forming the center pocket 174 is formed as an extended part of the stator mount 176, but it includes a larger diameter than the stator mount 176. Thus, the stator mount 176 provides an axial stop on a front end of the outer race of the rear bearing 106.

In an embodiment, end cap 170 additionally includes a molded structure 171 designed to primarily serve two purposes.

First, the molded structure 171 includes a ring-shaped portion 173 formed within the center pocket 174 in engagement with a rear end of the outer race of the rear bearing 106, a series of legs 175 that axially extend from the ring-shaped portion 173 through the radial body 172, and feet 177 that extend radially outwardly from front ends of the legs 175 to engage a front surface of the radial body 172. In this manner, the molded structure 171 axially engages the rear end of the outer race of the rear bearing 106 to axially retain the rear bearing 106 within the center pocket 174.

Second, the molded structure 171 includes a series of posts 179 extending axially from the feet 177 in the direction of the rotor 150. As discussed below, the posts 179 are arranged to structurally support the positional sensor board 190 adjacent the rear end of the rotor 150, thus allowing the magnetic (e.g., Hall) sensors 192 to magnetically sense the angular position of the rotor magnets 154.

Figure 15:
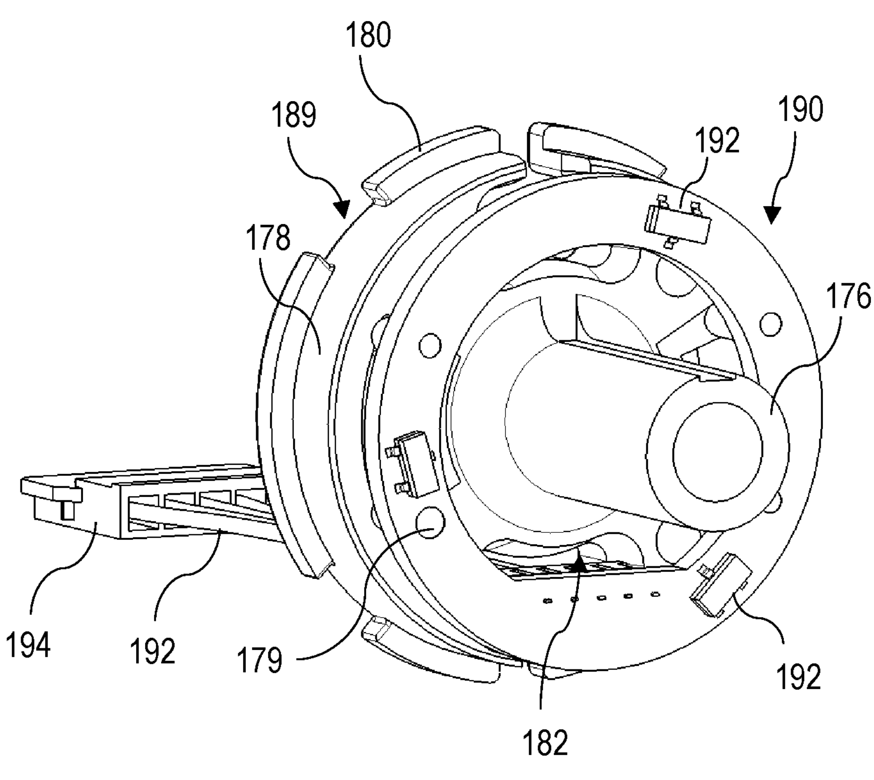
FIG. 15 depicts a perspective view of the end cap with a positional sensor board mounted thereon, according to an embodiment.
Figure 16:
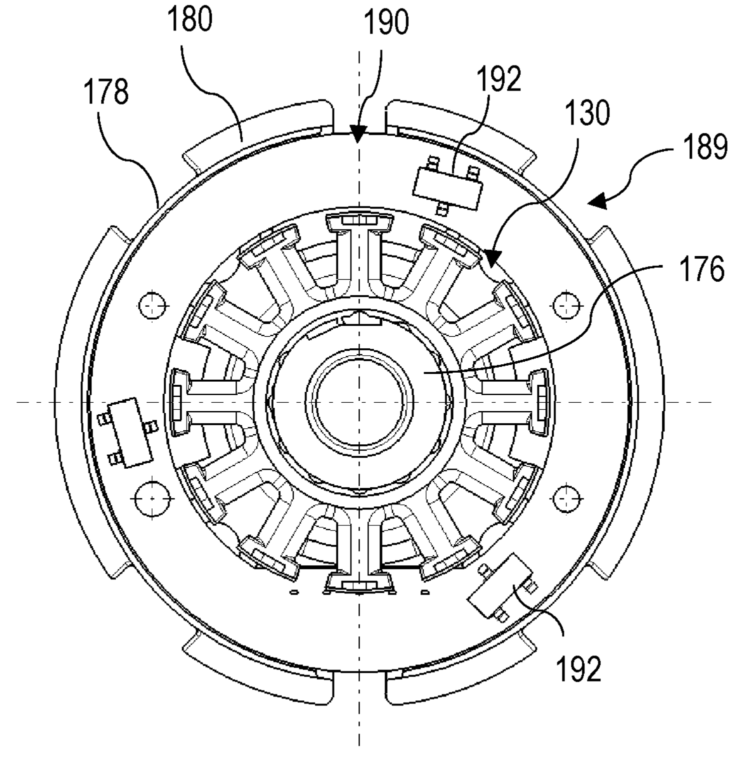
FIG. 16 depicts an axial view of the stator mounted on the end cap, according to an embodiment.

FIG. 15 depicts a perspective view of the end cap 170 with the positional sensor board 190 mounted thereon, according to an embodiment. FIG. 16 depicts an axial view of the stator 130 and the positional sensor board 190 mounted on the end cap 170, according to an embodiment.

In an embodiment, the positional sensor board 190 is disc-shaped including an outer diameter that is approximately equal to or greater than an outer diameter of the rotor 150 and slightly smaller than an outer diameter of the annular outer portion 178 of the end cap 170 (and thus slightly smaller than an inner diameter of the motor housing 110). The inner diameter of the positional sensor board 190 is approximately equal to or greater than the outer diameter of the stator 130. In an embodiment, positional sensor board 190 includes three Hall sensors 192 at 120 degrees apart. Additionally, it includes through-holes through which the posts 179 of the molded structure 171 are received to spatially support the positional sensor board 190 substantially parallel to the radial body 172 of the end cap 170 in close proximity to the rear end of the rotor 150. In an embodiment, the signal wires 192 connecting the positional circuit board 190 to connector 194 pass through one of the air inlets 182 of the end cap 170.

Figure 17:
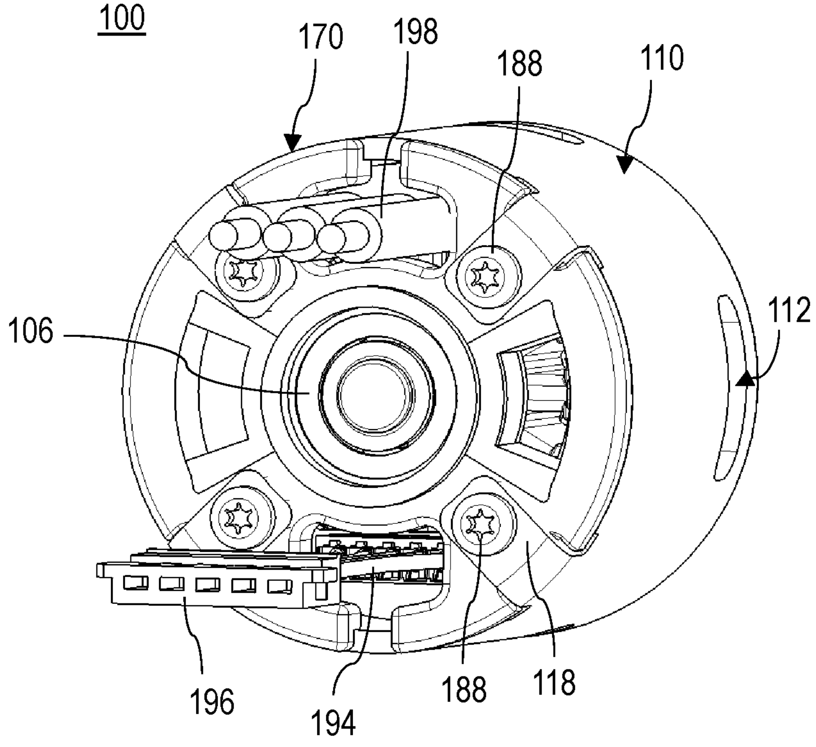
FIG. 17 depicts a rear perspective view of the motor, according to an embodiment.
Figure 18:
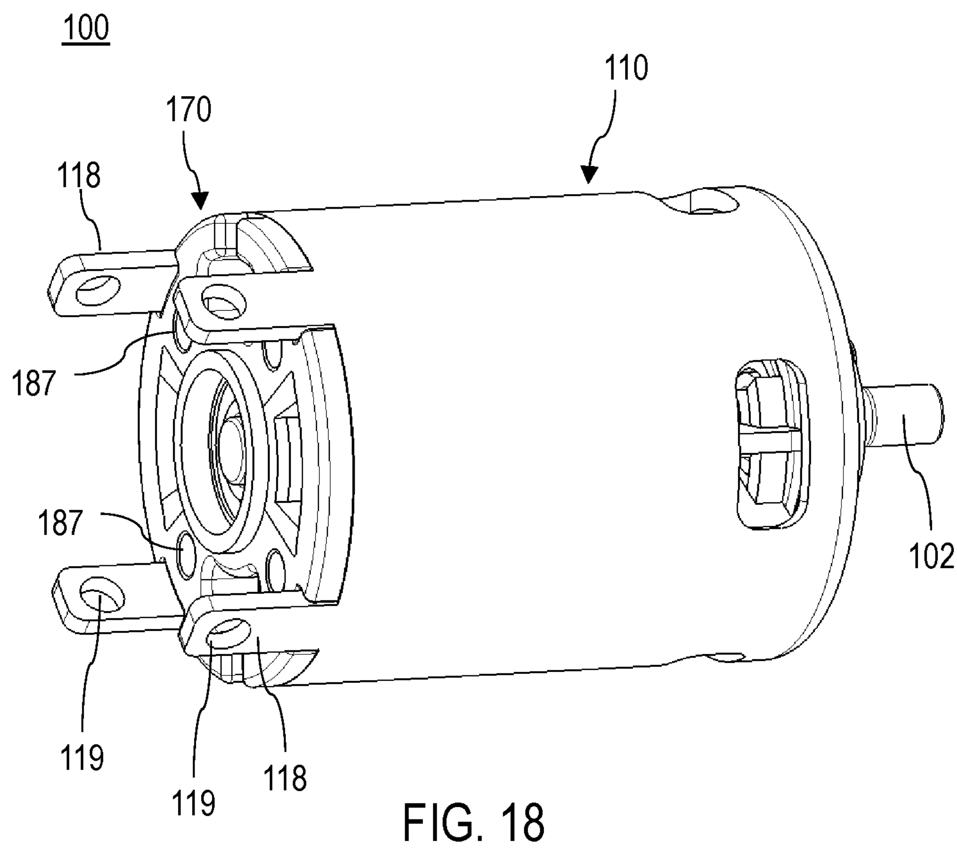
FIG. 18 depicts a perspective view of the motor, prior to the motor housing crimping the end cap, according to an embodiment.
Figure 19:
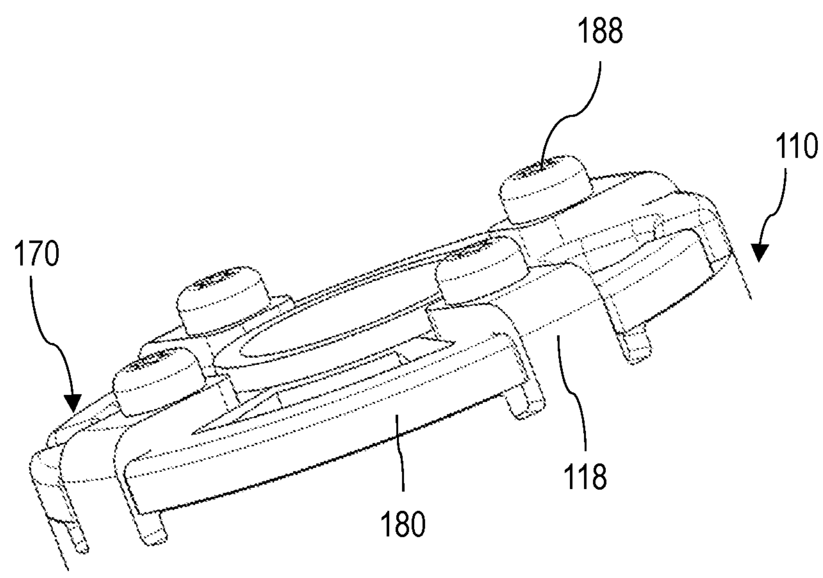
FIG. 19 depicts a partial perspective view of the end cap after mounting and crimped to the housing, according to an embodiment.

FIG. 17 depicts a rear perspective view of the motor, according to an embodiment. FIG. 18 depicts a perspective view of the motor, prior to the motor housing crimping the end cap, according to an embodiment. FIG. 19 depicts a partial perspective view of the end cap after mounting and crimped to the housing, according to an embodiment.

As shown in these figures, in an embodiment, during the assembly process, the end cap 170 is mounted on the open end of the motor housing 110, with the crimping projections 118 passing through the gaps 189 of the rim portion 180, to allow the rim portion 180 to meet the rear axial end of the motor housing 110. The signal wires 194, as well as a series of power wires 198 coupled to the terminals 141, are passed through the air inlets 182 in this process. The crimping projections 118 are then folded on the rear surface of the end cap 170, with a through-hole 119 of each crimping projection 118 being aligned with a corresponding threaded opening 187 of the end cap 170. The fasteners 188 are received axially through the through-holes 119 of the crimping projections 118 and tightened into the threaded openings 187. This structure fully secures the end cap 170 to the motor housing 110.

Figure 20:
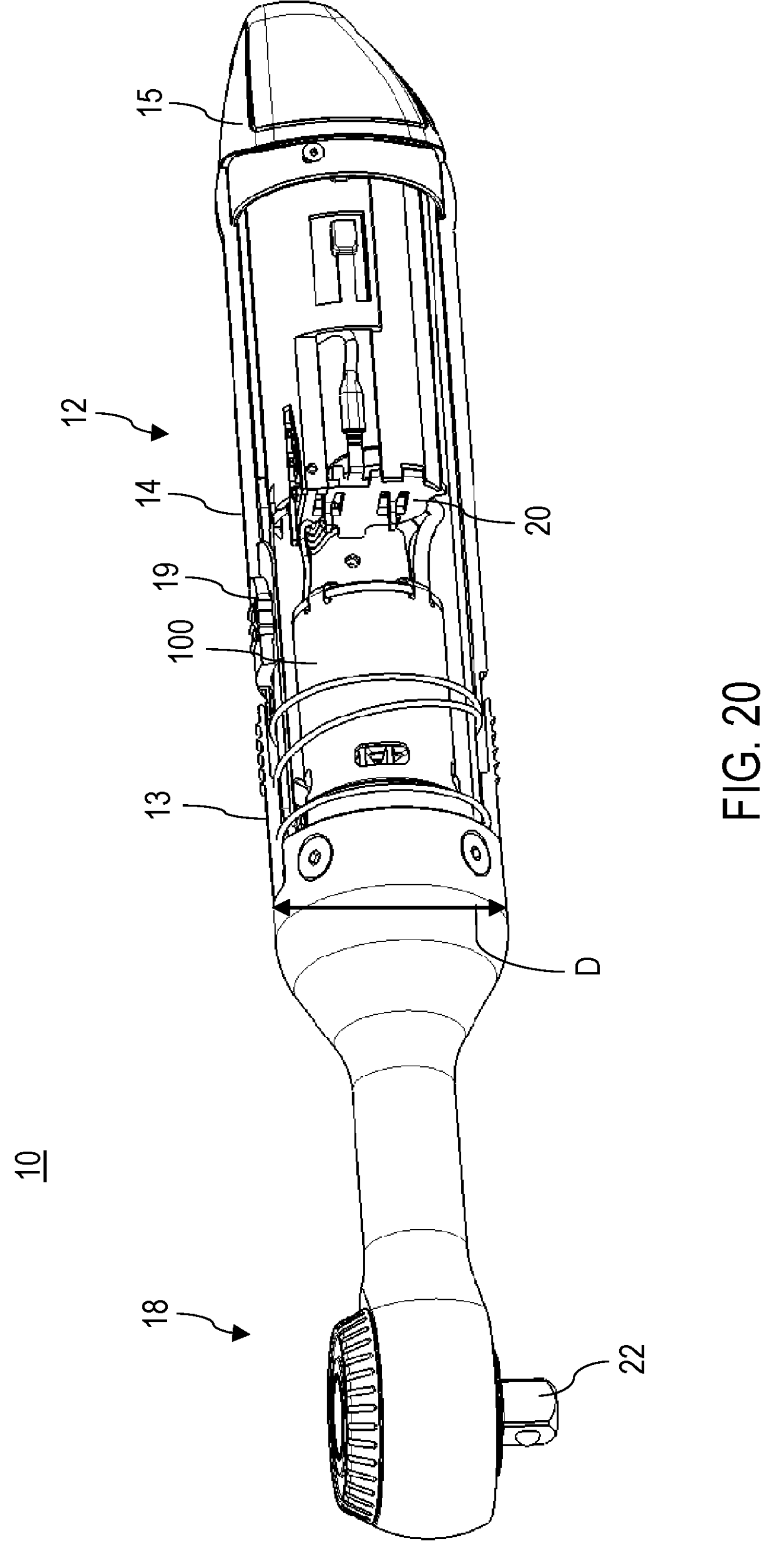
FIG. 20 depicts a perspective view of a power tool including the compact outer-rotor BLDC motor, according to an embodiment.

Referring to FIG. 20, an electric power tool 10 is described herein, according to an embodiment. In an embodiment, power tool 10, which in this exemplary embodiment is an electric ratchet wrench tool for applying torque to a fastener, includes a housing 12 formed by two clam shells, only one of which is shown in this figure. The housing 12 is elongated along a longitudinal axis and includes a motor case 13 within which the compact BLDC electric brushless motor 100 is disposed, a handle portion 14 extending rearwardly from the motor case 13 within which a control and/or power module 20 are supported, and a battery supporting portion 15 disposed at a rear end of the handle portion 14.

The control and/or power module 20 includes control and switching components, for example an inverter switch circuit controlled by a programmable controller, that controls flow of electric current to the motor 100. In an embodiment, a trigger assembly 19, which in an embodiment may be a slider switch, and which electrically communicates with the control and/or switch module 20, is mounted on the handle portion 14. Actuation of the trigger assembly 19 sends a signal to the controller to begin operating the motor 100.

In an embodiment, a ratchet head 18 is mounted on a front end of the housing 12 forward of the motor case 13. In an embodiment, motor 100 is orientated along the longitudinal axis of the housing 12 to provide a rotary output to the ratchet head 18 to drive an output member 22.

In an embodiment, the battery supporting portion 15 is configured to support one or more battery cells. In an example, the battery supporting portion 15 supports a single lithium ion battery cell having a maximum voltage of 4 volts and a nominal voltage of 3.75 volts. Using this battery cell, the motor is operable to produce a continuous operating torque of at least 10 Newton.meters and a maximum power output of at least 90 watts. It should be understood that a greater number of battery cells may be disposed in the battery supporting portion 15 to allow for an increased power and torque output. Also, it should be understood that the power tool 10 may be configured to receive a removable battery pack, such as a 12V max or a 20V max power tool battery pack.

In an embodiment, an outer diameter of the motor 100 is at most approximately 30 mm, preferably at most approximately 28 mm. The outer diameter of the rotor core 152 is at most approximately 26 mm, preferably at most approximately 24 mm. An axial length of the stator core 132 is approximately in the range of 15 mm to 20 mm. This allows the tool 100 to be configured with a maximum diameter (i.e., the maximum diameter of the housing 12 including the motor case 13, the handle portion 14, the trigger assembly 19, and the battery supporting portion 15) to be smaller than or equal to approximately 34 mm, preferably approximately 32 mm.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A brushless direct-current (BLDC) motor comprising:

a motor housing having an open end;

a stator housed within the motor housing;

a rotor shaft extending through the motor housing;

a rotor rotatably driven relative to the stator and mounted on the rotor shaft;

a positional sensor circuit board disposed within the motor housing and including a plurality of position sensors in magnetic interface with the rotor; and an end cap secured to the open end of the motor housing, wherein the end cap includes a radial body having a center pocket therein arranged to securely support a bearing of the rotor shaft, and a molded structure formed through at least a portion of the radial body, wherein the molded structure comprises: a first portion formed to axially constrain the bearing within the center pocket on a first side of the radial body, and a second portion forming a support structure projecting from a second side of the radial body to structurally support the positional sensor circuit board relative to the rotor.

2. The BLDC motor of claim 1, wherein the rotor is an outer-rotor construction and the end cap further includes a stator mount having a substantially cylindrical body extending into an inner core of the stator to support the stator within the rotor.

3. The BLDC motor of claim 2, wherein the positional sensor circuit board includes a disc-shaped construction having an outer diameter that is approximately equal to or greater than an outer diameter of the rotor, and an inner diameter that is approximately equal to or greater than an outer diameter of the stator, wherein the positional sensor circuit board is located around the stator mount.

4. The BLDC motor of claim 2, wherein the support structure comprises a plurality of posts projecting from the radial body around the stator mount.

5. The BLDC motor of claim 3, wherein the support structure further comprises a plurality of legs that extend through the radial along the enter pocket, wherein the plurality of posts is coupled to the plurality of legs.

6. The BLDC motor of claim 2, further comprising a stator collar mounted to an end of the stator and supporting a plurality of stator terminals, wherein the stator comprises a plurality of windings electrically coupled to the plurality of stator terminals and the plurality of stator terminals is coupled to a plurality of power wires to supply electric power to the plurality of windings, and wherein the stator collar is at least partially located between the stator mount and the positional sensor circuit board.

7. The BLDC motor of claim 6, wherein each of the plurality of stator terminals includes a main body having at least a curved portion, a terminal tab extending from a first part of the main body for coupling to one of the plurality of power wires, and a wire receiving portion extending from a second part of the main body for coupling to at least one of the plurality of windings, and wherein the stator collar comprise a mold ring formed to support the plurality of stator terminals at set angular positions and at least partially capture both surfaces of the main body of the plurality of stator terminals.

8. The BLDC motor of claim 1, wherein the first portion of the molded structure comprises a ring-shaped portion formed within the center pocket in engagement with a rear end of an outer race of the bearing.

9. The BLDC motor of claim 1, wherein the motor housing includes a main body having a solid metal cylindrical construction and a plurality of crimping projections projecting folded over the first side of the radial body of the end cap to securely retain the end cap to the motor housing.

10. A power tool comprising:

an elongated housing within which the BLDC motor of claim 1 is disposed;

a battery receiving portion formed at one end of the elongated housing configured to receive a battery therein; and a tool head mounted to another end of the elongated housing and supporting an output shaft driveably coupled to the motor, wherein the elongated housing has a maximum diameter of smaller than or equal to approximately 32 mm.

11. A brushless direct-current (BLDC) motor comprising:

a motor housing having an open end;

a stator housed within the motor housing;

a rotor shaft extending through the motor housing;

a rotor rotatably driven relative to the stator and mounted on the rotor shaft, wherein the rotor is an outer-rotor construction; and an end cap secured to the open end of the motor housing, wherein the end cap includes a radial body having a center pocket therein arranged to securely support a bearing of the rotor shaft and a stator mount having a substantially cylindrical body extending into an inner core of the stator to support the stator within the rotor;

wherein the motor housing includes a main body having a solid metal cylindrical construction and a plurality of crimping projections projecting folded over a rear surface of the radial body of the end cap to securely retain the end cap to the motor housing, wherein the end cap further comprises a molded structure formed through at least a portion of the radial body, wherein the molded structure comprises: a first portion formed to axially constrain the bearing within the center pocket, and a second portion forming a support structure projecting from a front surface of the radial body to structurally support a positional sensor circuit board relative to the rotor.

12. The BLDC motor of claim 11, wherein the end cap includes a plurality of threaded openings formed through the rear surface, and wherein the plurality of crimping projections is secured to the end cap via a plurality of fasteners passing through a plurality of through-holes formed in the plurality of crimping projections and fastened into the plurality of threaded openings of the end cap.

13. The BLDC motor of claim 11, wherein an outer circumference of the radial body includes a plurality of recessed portions that receive the plurality of crimping projections therethrough.

14. A power tool comprising:

an elongated housing within which the BLDC motor of claim 11 is disposed;

a battery receiving portion formed at one end of the elongated housing configured to receive a battery therein; and a tool head mounted to another end of the elongated housing and supporting an output shaft driveably coupled to the motor, wherein the elongated housing has a maximum diameter of smaller than or equal to approximately 32 mm.

15. A brushless direct-current (BLDC) motor comprising:

a motor housing;

a stator including a plurality of windings housed within the motor housing;

a rotor shaft;

a rotor rotatably driven relative to the stator and mounted on the rotor shaft, wherein the rotor is an outer-rotor construction; and a stator collar mounted to an end of the stator and supporting a plurality of stator terminals, wherein the plurality of stator terminals is electrically coupled to the plurality of stator windings and to a plurality of power wires to supply electric power to the plurality of windings, wherein each of the plurality of stator terminals includes a main body having at least a curved portion, a terminal tab extending from a first part of the main body for coupling to one of the plurality of power wires, and a wire receiving portion extending from a second part of the main body for coupling to at least one of the plurality of windings, and wherein the stator collar comprises a mold ring formed to support the plurality of stator terminals at set angular positions and at least partially capture both surfaces of the main body of the plurality of stator terminals.

16. The BLDC motor of claim 15, further comprising an end cap mounted to an open end of the motor housing and including a stator mount having a substantially cylindrical body extending into an inner core of the stator to support the stator within the rotor, wherein the stator collar is mounted around the stator mount.

17. The BLDC motor of claim 15, wherein each wire receiving portion is folded over the main body, and the mold ring includes a plurality of recessed regions through which the wire receiving portions are located.

* * * * *